United States Patent
Li

(10) Patent No.: US 9,720,427 B2
(45) Date of Patent: Aug. 1, 2017

(54) CONTROLLER FOR VOLTAGE REGULATOR

(71) Applicant: NXP B.V., Eindhoven (NL)

(72) Inventor: Kim Li, Sheffield (GB)

(73) Assignee: NXP B.V., Eindhoven (NL)

( * ) Notice: Subject to any disclaimer, the term of this patent is extended or adjusted under 35 U.S.C. 154(b) by 669 days.

(21) Appl. No.: 13/855,163

(22) Filed: Apr. 2, 2013

(65) Prior Publication Data

US 2013/0271099 A1    Oct. 17, 2013

(30) Foreign Application Priority Data

Apr. 17, 2012 (EP) .................................... 12164409

(51) Int. Cl.
*H02M 3/158* (2006.01)
*G05F 1/56* (2006.01)
*H02M 1/00* (2006.01)

(52) U.S. Cl.
CPC .............. *G05F 1/56* (2013.01); *H02M 3/158* (2013.01); *H02M 2001/0019* (2013.01); *H02M 2001/0045* (2013.01)

(58) Field of Classification Search
USPC ....... 323/234, 237, 265, 273, 274, 275, 282, 323/283, 284, 285, 299, 300
See application file for complete search history.

(56) References Cited

U.S. PATENT DOCUMENTS

| | | | |
|---|---|---|---|
| 6,150,798 A | 11/2000 | Ferry et al. | |
| 6,717,383 B1 * | 4/2004 | Brunt et al. | 318/723 |
| 7,852,640 B2 * | 12/2010 | Ye et al. | 363/21.12 |
| 2006/0006850 A1 * | 1/2006 | Inoue et al. | 323/265 |
| 2006/0087303 A1 * | 4/2006 | Hartular et al. | 323/283 |
| 2008/0225563 A1 * | 9/2008 | Seo | 363/123 |
| 2009/0021228 A1 | 1/2009 | Carr et al. | |
| 2009/0134861 A1 | 5/2009 | Saeki et al. | |
| 2010/0026250 A1 * | 2/2010 | Petty | 323/271 |
| 2012/0019220 A1 * | 1/2012 | Grimm | 323/274 |
| 2012/0074869 A1 * | 3/2012 | Cronmiller | 315/295 |
| 2012/0293021 A1 * | 11/2012 | Teggatz et al. | 307/151 |

OTHER PUBLICATIONS

Millman, J. "Microelectronics: Digital and Analog Circuits and Systems", McGraw-Hill, New York, pp. 676-685 (1979).
Razavi, B. "Design of Analog CMOS Integrated Circuits", McGraw-Hill, pp. 410-421 (2003).
"Micrel's Breakthrough 8 MHz Buck Regulator Offers Solution for Next Generation Slim Cell Phones", Micrels Semiconductor, retrieved from the Internet at: http://www.arrownac.com/resource, 1 pg. (Aug. 2006).
"Ultra Low-Power ZigBee Based Transmissions Using a Self-Powered Switch", Jennic Ltd., retrieved from the Internet at: http://www.jennic.com/download_file.php?supportFile=JN-WP-7003-Self-Powered-Switch-1v0, 5 pgs. (Oct. 2009).
Extended European Search Report for European Patent Appln. No. 12164409.0 (Sep. 27, 2012).

* cited by examiner

*Primary Examiner* — Jeffrey Gblende

(57) ABSTRACT

A controller for a voltage regulator is disclosed. The controller is switchable between first and second modes of operation in which the controller is adapted to control the regulator to operate in switching and linear modes respectively. The controller is further adapted to respond to an input voltage to the voltage regulator to enter a third mode of operation in which the input voltage is coupled directly to an output terminal.

15 Claims, 1 Drawing Sheet

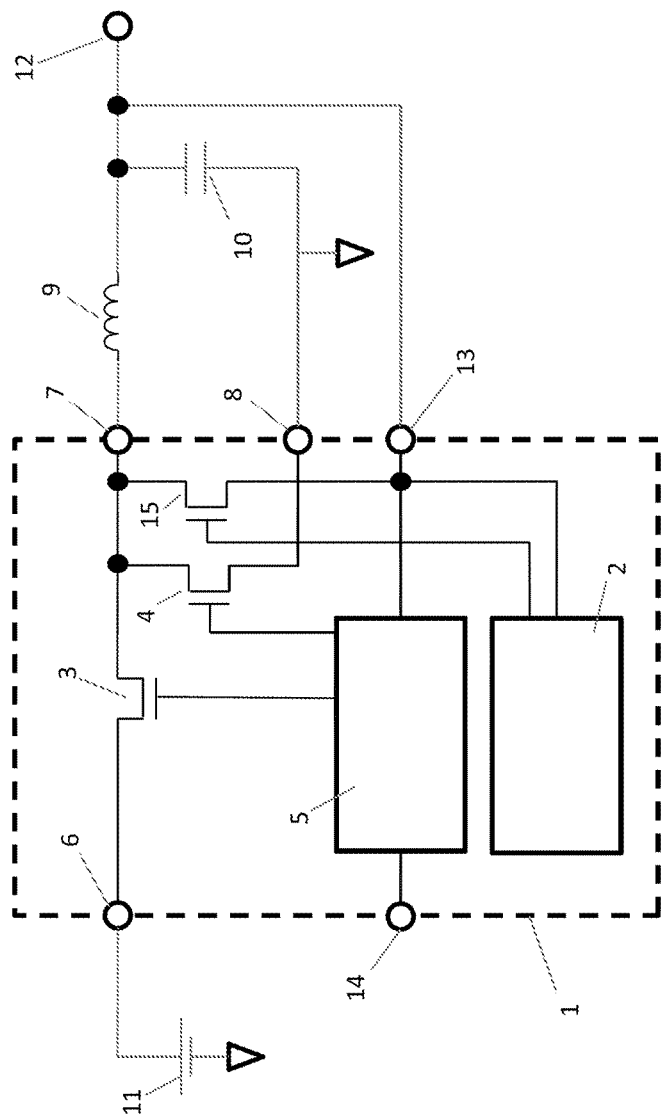

CONTROLLER FOR VOLTAGE REGULATOR

CROSS-REFERENCE TO RELATED APPLICATIONS

This application claims the priority under 35 U.S.C. §119 of European patent application no. 12164409.0, filed on Apr. 17, 2012, the contents of which are incorporated by reference herein.

The invention relates to a controller for a voltage regulator.

Voltage regulators are used in a wide variety of electronic circuits to maintain the supply voltage within acceptable limits. Generally, there are two types of voltage regulator in common use: switching regulators and linear regulators. Switching regulators control the duty cycle of switching of one or more transistor switches to maintain an output voltage at a desired value and are very efficient since very little power is dissipated in the switches. Linear regulators use a transistor to cause a voltage drop between input and output voltages and are less efficient since a significant amount of power may be dissipated in the transistor.

At face value, it would therefore seem as though switching regulators would be the natural choice. However, there are a variety of reasons why linear regulators might be used. Amongst these reasons is the fact that the energy required to achieve a stable output voltage from a linear regulator is generally far lower than from a switching regulator. This characteristic comes in useful, for example, in low-power communications products (such as those using the IEEE 802.4.15 and Zigbee standards). Such products may be powered continuously (in which case a switching regulator would be an excellent choice due to its high efficiency) or may be required to operate off harvested energy to transmit a burst of data when an event occurs.

For example, the Zigbee Green standard requires that a burst of three packets can be transmitted using only 100 µJ of harvested energy. A typical switching regulator will consume approximately this amount of energy simply in starting-up. On the other hand, a linear regulator can achieve a stable output voltage after having consumed about three orders of magnitude less energy, leaving the majority of the harvested energy available for making the burst transmission. Thus, different applications of the same product (i.e. a low-power radio) make different demands in terms of voltage regulation, which means that at least two different products are required to meet these different demands.

Typically, the two products are a buck regulator and a low-dropout linear regulator. However, there exists a further problem with both of these. Specifically, they are often used with batteries or harvested energy sources with unpredictable, but low, voltage. The voltage headroom required for operation of both types of device limits the lowest voltage from which they can operate to produce a stable output voltage. This can seriously affect the lifespan of the battery or even the capability to operate from harvested energy at all.

According to a first aspect of the invention, there is provided a controller for a voltage regulator, the controller being switchable between first and second modes of operation in which the controller is adapted to control the regulator to operate in switching and linear modes respectively, wherein the controller is further adapted to respond to an input voltage to the voltage regulator to enter a third mode of operation in which the input voltage is coupled directly to an output terminal.

By providing a controller for a voltage regulator that can be switched between switching and linear modes of control and which responds to the input voltage to adopt a third mode of operation in which the regulator is effectively bypassed, the invention allows the above-mentioned problems to be overcome.

Typically, the regulator comprises a first transistor coupled between an input terminal of the voltage regulator and the output terminal and a second transistor coupled between the output terminal and a ground terminal. For example, if the first and second transistors are CMOS transistors, the drain and source of the first transistors may be coupled to the input terminal of the voltage regulator and the output terminal respectively, and the drain and source of the second transistor may be coupled to the output terminal and ground respectively. The gates of each transistor may be coupled to the controller so that this can control the operation of these transistors. Thus, the controller may be adapted to control a regulator comprising the above-mentioned arrangement of transistors.

The controller may be adapted to drive the first and second transistors as switches when in the first mode such that a desired voltage is maintained on a feedback terminal. Thus, the controller may be adapted to operate the regulator as a buck converter. An inductor and capacitor in series will typically be coupled between the output and ground terminals, the junction of the inductor and capacitor providing a supply voltage, in use. A feedback terminal of the controller may be coupled to the junction of the inductor and capacitor.

Alternatively, the controller may be adapted to drive the first transistor in a linear region of operation and the second transistor in a high impedance region of operation when in the second mode such that a desired voltage is maintained on a feedback terminal. Thus, the controller may be adapted to operate the regulator as a linear regulator. In this case, the second transistor is effectively open circuit (i.e. the channel is pinched off with field effect devices and the transistor is cut off in the case of bipolar devices) and the first transistor operates as a pass transistor, causing a voltage drop from the input voltage so that a desired output voltage is obtained at the output terminal.

The controller may further comprise a switch for coupling the output terminal to a feedback terminal when in the second mode of operation. The switch will usually be a transistor. It provides a means of coupling the output terminal and feedback terminal automatically without external circuitry being required (which is particularly useful if the controller forms part of an integrated circuit).

The controller may be hardwired to be switched into the second mode of operation and the output terminal is coupled to a feedback terminal. Thus, the controller always operates in either the second or third mode of operation. This is useful when it is known that there will never be a need in an envisaged application for the first (i.e. switching) mode of operation. When the controller forms part of an integrated circuit, this arrangement obviates the need to make the feedback terminal available externally on a pin.

Typically, the controller is switchable between the first and second modes of operation in response to a control signal.

Preferably, the controller enters the third mode in response to the input voltage falling below a predefined threshold voltage.

The threshold voltage may be the same when the controller is in the first mode and when the controller is in the second mode.

Alternatively, the threshold voltage may be different when the controller is in the first mode to when the controller is in the second mode.

The input voltage is preferably coupled directly to the output terminal by switching the first transistor on.

In accordance with a second aspect of the invention, there is provided an integrated circuit comprising a controller according to any of the preceding claims.

The integrated circuit preferably further comprises a voltage regulator having a first transistor coupled between an input terminal of the voltage regulator and the output terminal and a second transistor coupled between the output terminal and a ground terminal.

The integrated circuit may further comprise a microcontroller, for example adapted for use in a wireless communications product, the microcontroller being coupled to receive power from the voltage regulator.

The microcontroller is typically capable of operating in a continuous mode and a burst mode. Thus, the controller may be switched into the first mode when the microcontroller is operating in the continuous mode and may be switched into the second mode when the microcontroller is operating in the burst mode.

Examples of the invention will now be described in detail with reference to the accompanying drawings, in which FIG. 1 shows a partial block diagram of an integrated circuit comprising a controller for a voltage regulator according to the invention.

The invention provides a voltage regulator controller that is capable of controlling external transistors either to act as switches when in a switching mode or as linear elements when in a linear mode. Thus, the controller can configure the external transistors to be part of a switching regulator or a linear regulator. The controller is configured to respond to a drop in voltage below a threshold to bypass the voltage regulator, for example by switching one of the external transistors on.

FIG. 1 shows an integrated circuit 1 comprising components forming part of a voltage regulator and a microprocessor core 2. The components forming part of the voltage regulator are a pair of transistor 3, 4 and a controller 5. The first transistor 3 is connected with its drain to an input terminal 6 and its source to an output terminal 7. The second transistor 4 has its drain connected to the output terminal 7 and its source to a ground terminal 8. The gates of both transistors 3, 4 are connected to the controller 5 so that it can control the operation of both transistors. External to the integrated circuit, an inductor 9 and capacitor 10 complete the voltage regulator. The controller 5 is capable of operating in one of three modes.

In the first mode (also known as switching mode), the controller 5 drives transistors 3 and 4 so that they are either on or off. In other words, they are driven as switches. Thus, transistor 3 is able to couple the DC voltage from battery 11 to the inductor 9 or to isolate the battery 11 from inductor 9. Transistor 4 is able to couple the output terminal 7 (and hence inductor 9) to the ground terminal 8 or to isolate the output terminal 7 from the ground terminal 8. Transistors 3 and 4 are driven precisely out of phase with each other so that the inductor 9 is either coupled to the battery 11 (via transistor 3) or to ground (via transistor 4). Together, the two transistors 3, 4, the controller 5, the inductor 9 and the capacitor 10 form a buck converter.

The controller 5 is able to monitor the output voltage from the buck converter on terminal 12 via a feedback terminal 13. This is coupled internally to the controller 5 and to provide power to the microprocessor 2. The controller 5 responds to the voltage measured on feedback terminal 13 by varying the duty cycle or pulse frequency with which transistors 3 and 4 are switched to maintain the voltage at terminal 12 at a desired value. For example, whereas the battery voltage may be nominally 3.6V, the output voltage at terminal 12 may be maintained at a value of 1.7V to 1.9V.

The controller 5 is switched between the first and second modes of operation by application of a control signal to control terminal 14. For example, a high signal may be applied to control terminal 14 to cause the controller to enter the first mode and a low signal to cause it to enter the second mode, or vice-versa. In other embodiments, the controller 5 may be hardwired into either mode where it is envisaged that the integrated circuit 1 will only be used in that mode. In those embodiments, the control terminal 14 is not required.

In the second mode (also known as linear mode), the controller 5 drives transistor 4 off so that the output terminal 7 is isolated from the ground terminal 8. Transistor 3 is driven in a linear mode so that there is a voltage drop across it. Thus, the voltage at the output terminal 7 will be lower than the battery voltage at input terminal 6. The controller 5 monitors the output voltage at terminal 12 via feedback pin and adjusts the drive voltage to transistor 3 (and hence the voltage drop across it) so that the output voltage is maintained at a desired value. For example, whereas the battery voltage may be nominally 3.6V, the output voltage at terminal 12 may be maintained at a value of 1.7V to 1.9V.

The inductor 9 is not required when the controller 5 is in the second mode, although it may be left in circuit. Alternatively, it may be short-circuited (for example by an external link or switch) or replaced by an external link (if it is known that the controller 5 will only need to operate in the second mode). As mentioned above, there may be applications where it is envisaged that the controller 5 will only operate in one mode and hence be hardwired into that mode. If the controller 5 is hardwired into the second mode then the output terminal 7 may be internally coupled to the feedback terminal 13 and the inductor 9 omitted (i.e. replaced by a short circuit). The internal coupling may be by hardwiring or by an additional transistor switch 15 operated under the control of microprocessor 2.

The third mode is entered when the voltage on input terminal 6 drops below a threshold value. The threshold value is the same (in this embodiment) whether the controller 5 is initially in the first or the second mode. A typical threshold value is 1.9V. In the third mode, all regulation function ceases. Transistor 3 is switched on and transistor 4 is switched off. Thus, the battery 11 is coupled directly to the output terminal 7. No feedback voltage is monitored at feedback terminal 13. The third mode allows the battery to directly power the microprocessor core 2 (and other circuitry connected to terminal 12) when the battery voltage has fallen to a value at which regulation can no longer be sustained but which is still adequate to operate the microprocessor core 2. Thus, the useful battery lifetime is extended.

Since the same transistor 3 is used in both switching and linear modes of operation there is no need to provide separate transistors for each mode. This results in a large saving (approximately 50%) in die area on the integrated circuit since these transistors are typically the largest component.

As mentioned above, the voltage regulator finds particular use in low-power wireless communications products, for example Zigbee radios. Thus, the microprocessor core 2 can be conveniently adapted for use in such a wireless communications product. The controller 5 is typically switched into the first mode when the microprocessor core 2 is to be used in a continuous fashion (i.e. continuously powered) and into the second mode when the microprocessor core 2 is to be used in a burst mode to send a radio transmission ad hoc. The burst mode is typically used with energy harvesting applications where very little energy is available to transmit the burst. A typical example is where a light switch is depressed and the energy used to depress the switch is harvested (for example by a piezoelectric device). The harvested energy is used to power the microprocessor core 2 and other circuitry for sending a burst transmission to indicate to remote equipment that the light switch has been depressed.

The switching mode is typically unsuitable for use with harvested energy applications because too much energy is consumed by the inductor 9 and capacitor 10 before a stable output voltage can be achieved. For example, in the switching mode, the total energy consumed by the inductor 9 and capacitor 10 during start-up is given by:

$$E_{TOTAL} = \frac{1}{2}CV^2 + \frac{1}{2}LI^2$$

where $E_{TOTAL}$ is the total energy consumed, C is the value of the capacitor 10 (typically 33 μF), L is the inductance of inductor 9 (typically 68 μH), V is the output voltage (typically 2V) and I is the current flowing in inductor 9 (typically 13 mA). With the typical values given, the value of $E_{TOTAL}$ is 77 μJ. However, simulation shows that even more energy will be consumed due to start-up overshoot and undershoot of the output voltage. Thus, it is not possible to meet the Zigbee Green requirement of transmitting three packets using only 100 μJ since at least 77 μJ will be consumed in starting up the switching regulator.

On the other hand, with a linear regulator a much smaller capacitor 10 (typically 100 nF) can be used and inductor 9 can be omitted entirely. In this case, using the above formula, the total energy consumed by a linear regulator in start-up is around 200 nJ, which leaves the vast majority of the 100 μJ available for the burst transmission available for that purpose.

Other variations to the disclosed embodiments can be understood and effected by those skilled in the art in practising the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A voltage regulator circuit comprising:
  a voltage regulator; and a
  a controller, the controller being switchable between first and second modes of operation in which the controller is configured to control the voltage regulator to operate in switching and linear modes respectively, wherein the controller is further configured to respond to an input voltage to the voltage regulator to enter a third mode of operation in which the input voltage is coupled directly to an output terminal.

2. The voltage regulator circuit according to claim 1, wherein the voltage regulator comprises:
  a first transistor coupled between an input terminal of the voltage regulator and the output terminal; and
  a second transistor coupled between the output terminal and a ground terminal.

3. The voltage regulator circuit according to claim 2, wherein the controller is configured to drive the first and second transistors as switches when in the first mode of operation such that a desired voltage is maintained on a feedback terminal.

4. The voltage regulator circuit according to claim 2, wherein the controller is configured to drive the first transistor in a linear region of operation and the second transistor in a high impedance region of operation when in the second mode of operation such that a desired voltage is maintained on a feedback terminal.

5. The voltage regulator circuit according to claim 1, further comprising:
  a switch configured to couple the output terminal to a feedback terminal when in the second mode of operation.

6. The voltage regulator circuit according to claim 1, wherein the controller is hardwired to be switched into the second mode of operation and the output terminal is coupled to a feedback terminal.

7. The voltage regulator circuit according to claim 1, wherein the controller is switchable between the first and second modes of operation in response to a control signal.

8. The voltage regulator circuit according to claim 1, wherein the controller enters the third mode of operation in response to the input voltage falling below a predefined threshold voltage.

9. The voltage regulator circuit according to claim 8, wherein the threshold voltage is identical when the controller is in the first mode of operation and when the controller is in the second mode of operation.

10. The voltage regulator circuit according to claim 8, wherein the threshold voltage is different when the controller is in the first mode of operation and when the controller is in the second mode of operation.

11. The voltage regulator circuit according to claim 2, wherein the input voltage is coupled directly to the output terminal by switching the first transistor on.

12. An integrated circuit comprising the controller according to claim 1.

13. The integrated circuit according to claim 12, wherein the voltage regulator further comprises:
  a first transistor coupled between an input terminal of the voltage regulator and the output terminal; and
  a second transistor coupled between the output terminal and a ground terminal.

14. The integrated circuit according to claim 12, further comprising:
  a microcontroller, the microcontroller being coupled to receive power from the voltage regulator.

15. The integrated circuit according to claim 14, wherein the microcontroller is configured to operate in a continuous mode and a burst mode.

* * * * *